United States Patent
Gordon et al.

(10) Patent No.: US 7,152,054 B2
(45) Date of Patent: Dec. 19, 2006

(54) CONTEXT-BASED HELP ENGINE, DYNAMIC HELP, AND HELP ARCHITECTURE

(75) Inventors: Jonathan Cannon Gordon, Redmond, WA (US); Timothy Rand Sullivan, Seattle, WA (US); Justin Shane McRoberts, Seattle, WA (US); Scott R. Swanson, Redmond, WA (US); Alex Aben-Athar Kipman, Duvall, WA (US); Madhavi Lakamsani, Bellevue, WA (US); Paul Glenn McKee, Redmond, WA (US); Saurabh Jain, Bellevue, WA (US); Dale Elton Rogerson, Seattle, WA (US); Octavia Petrovici, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 10/645,290

(22) Filed: Aug. 21, 2003

(65) Prior Publication Data

US 2004/0044635 A1   Mar. 4, 2004

Related U.S. Application Data

(63) Continuation-in-part of application No. 10/100,714, filed on Mar. 19, 2002, now Pat. No. 6,959,294.

(60) Provisional application No. 60/304,107, filed on Jul. 10, 2001.

(51) Int. Cl.
*G06F 17/00* (2006.01)
*G06N 5/02* (2006.01)
(52) U.S. Cl. .................... 706/50; 706/45; 706/46
(58) Field of Classification Search ............. 706/50, 706/45, 46; 709/246
See application file for complete search history.

(56) References Cited

U.S. PATENT DOCUMENTS

| 6,405,215 | B1* | 6/2002 | Yaung .................. 707/104.1 |
| 6,959,339 | B1* | 10/2005 | Wu et al. .................... 709/246 |
| 7,020,697 | B1* | 3/2006 | Goodman et al. .......... 709/223 |
| 2002/0073080 | A1* | 6/2002 | Lipkin ........................... 707/3 |
| 2002/0169771 | A1* | 11/2002 | Melmon et al. ................ 707/5 |
| 2002/0178140 | A1* | 11/2002 | Woodmansee et al. ........ 707/1 |
| 2003/0014383 | A1* | 1/2003 | Cho et al. ....................... 707/1 |

OTHER PUBLICATIONS

Al Stevens, Help for Windows Help Authors, Apr. 1994, Dr. Dobb's Journal, 86-91.*
Ford, D. "Online context-sensitive help", *Journal of Pascal, Ada & Modula-2*, 1989, 8(6), 34-41, 44-55.
Gaines, B.R. et al., "An Integrated knowledge support system", *FGCS, Fifth Generation Computer Systems*, 1992, 2, 1157-64.
Kay, D.B. "Why Mosiac isn't enough", *16th National Online Meeting Proceedings*, 1995, 211-15.

(Continued)

*Primary Examiner*—Joseph P. Hirl
(74) *Attorney, Agent, or Firm*—Woodcock Washburn LLP

(57) ABSTRACT

The aforementioned need is satisfied by the present invention in which a help architecture supports an application and a help engine operating on a computer, where the help engine is for locating help topics relevant to the application. In the help architecture, at least one help library stores a plurality of help topics therein, where the help topics are accessible to a user from the help library by way of the computer, and a central store stores topic metadata corresponding to help topics available from each help library. The central store in response to a search request from the help engine locates topic metadata relevant to the search request and returns information from the located topic metadata.

18 Claims, 8 Drawing Sheets

OTHER PUBLICATIONS

Romanczuk-Requile, A. et al., "A context help system based on intelligent diagnosis processes aiming to design and maintain object-oriented software packages", *Object-Oriented Technology. ECOOP Workshop Reader*, 1998, 64-65.

Stevens, A., "Help for Windows help authors", *Dr. Dobb's Journal*, 1994, 4, 86-91.

Patrick, A. et al., "One Proven methodology for designing robust online help systems", *Conference Proceedings. SIGDOC'93. The 11th Annual International Conference*, 1993, 223-32.

Young, D. et al., "Dynamic help: Automated online documentation", *ICSI, Proceedings of the Second International Conference on Systems Integration*, 1992, 448-57.

\* cited by examiner

CONTEXT-BASED HELP ENGINE, DYNAMIC HELP, AND HELP ARCHITECTURE

CROSS-REFERENCE TO RELATED APPLICATIONS

This application is a continuation-in-part and claims the benefit of U.S. patent application Ser. No. 10/100,714 filed Mar. 19, 2002 and entitled "CONTEXT-BASED HELP ENGINE AND DYNAMIC HELP", now U.S. Pat. No. 6,959,294, issued Oct. 25, 2005, and claims the benefit of U.S. Provisional Application No. 60/304,107, filed Jul. 10, 2001 and entitled "CONTEXT-BASED HELP ENGINE AND DYNAMIC HELP WINDOW", the subject matter of each being hereby incorporated by reference in its entirety.

TECHNICAL FIELD

The present invention relates to a mechanism for providing help in a dynamic manner to a user of an application or the like. More particularly, the present invention relates to such a mechanism that employs a context-sensitive help engine such that the user is presented with help topics that are relevant to a current overall context of the application. Even more particularly, the present invention relates to such a mechanism that can obtain such help topics from one or more local and/or remote sources by way of a help architecture.

BACKGROUND OF THE INVENTION

In using a software application or the like on a computer or the like, a user is often able to avail himself or herself of a help function built into or attached to the application. Such help function can be quite thorough and even exhaustive, and may contain a number of help topics or the like that can be accessed by way of an index of key words, a table of contents, or a search phrase, among other things.

Importantly, a user searching for one or more particular help topics must have at least a rough idea of the key words, contents section, or search phrase to employ to find such help topics. However, the user can easily be led astray by a bad choice, or may at times not even have any notion of where to start. Finding an appropriate help topic can easily become a frustrating and fruitless exercise, then.

In at least some applications and some instances with regard to such applications, and in an effort to alleviate the aforementioned situation, a particular portion or activity of the application may be linked directly to one or more help topics of the help function, where the linked-to pre-defined help topics presumably correspond to the particular portion. Accordingly, a user working at the particular portion of the application can merely actuate the link and immediately be directed to the pre-defined presumably corresponding help topics. For example, if the activity is saving a file worked on by the user with the application, a saving transaction may provide a help switch that when actuated by a user transfers such user to various 'save file' help topics.

In the aforementioned circumstance, the help function may be said to be activity-sensitive in that the help topics presented to the user are based on and relevant to the current activity of the application. However, such activity sensitivity does not take into account the current overall context of the application. That is, the topics displayed relate only to saving a file, and not to the type of file that is being saved, the way the file is being edited, the tools used to edit the file, any libraries employed to develop the file, any selections relating to the file, and the like. Put simply, the topics displayed are most likely pre-defined based only on the activity of saving a file. However, it may very well be that the user is interested in a help topic relating to another aspect of the current overall context of the application.

Accordingly, a need exists for a help engine that provides dynamic help to a user of an application based on the current overall context of the application. More particularly, a need exists for such a help engine that provides dynamic help that updates when the overall context of the application changes. Further, a need exists for such a help engine that models current overall context and obtains, prioritizes, and displays help topics based thereon, whereby the displayed help topics are of interest and help to the user. Still further, a need exists for a help architecture that allows the help engine to obtain help from one or more help sources.

SUMMARY OF THE INVENTION

The aforementioned need is satisfied by the present invention in which a help architecture supports an application and a help engine operating on a computer, where the help engine is for locating help topics relevant to the application. In the help architecture, at least one help library stores a plurality of help topics therein, where the help topics are accessible to a user from the help library by way of the computer, and a central store stores topic metadata corresponding to help topics available from each help library. The central store in response to a search request from the help engine locates topic metadata relevant to the search request and returns information from the located topic metadata.

The returned information includes for each piece of topic metadata a set of attributes relating to the corresponding help topic and display information. The help engine filters each help topic based on the set of attributes thereof and displays the display information relating to each filtered help topic to the user. The displayed information for each help topic includes a summary of the help topic and an address from which the help topic may be obtained from the corresponding help library. The user reviews the summary corresponding to each help topic to determine whether the help topic is of further interest, and if so, the user employs the address of the help topic of interest to obtain such help topic from the corresponding help library.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
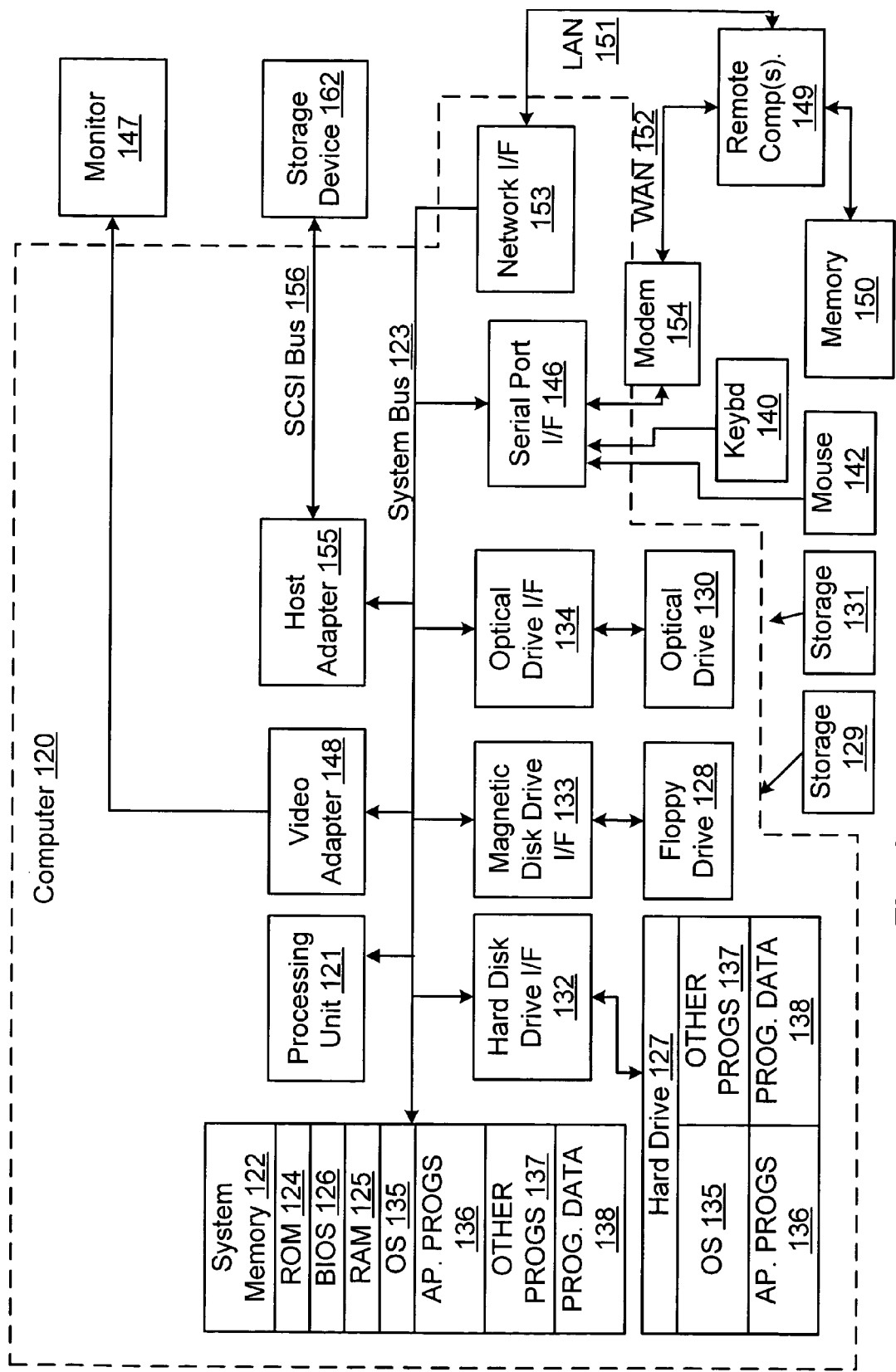
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Help Engine and Operation Thereof

One overall goal of the present invention is to provide a help function or engine in connection with a particular application or the like, where the help engine delivers help topics to a user of the application that are relevant to the current overall context of the application with a minimal amount of effort from the user. To deliver relevant help, the help engine obtains or is provided with a current status of what the user wants to accomplish based on what the user has done and is doing in connection with the application. In particular, the current status is represented as a model of the current overall context using string-based attributes and keywords.

Figure 2:
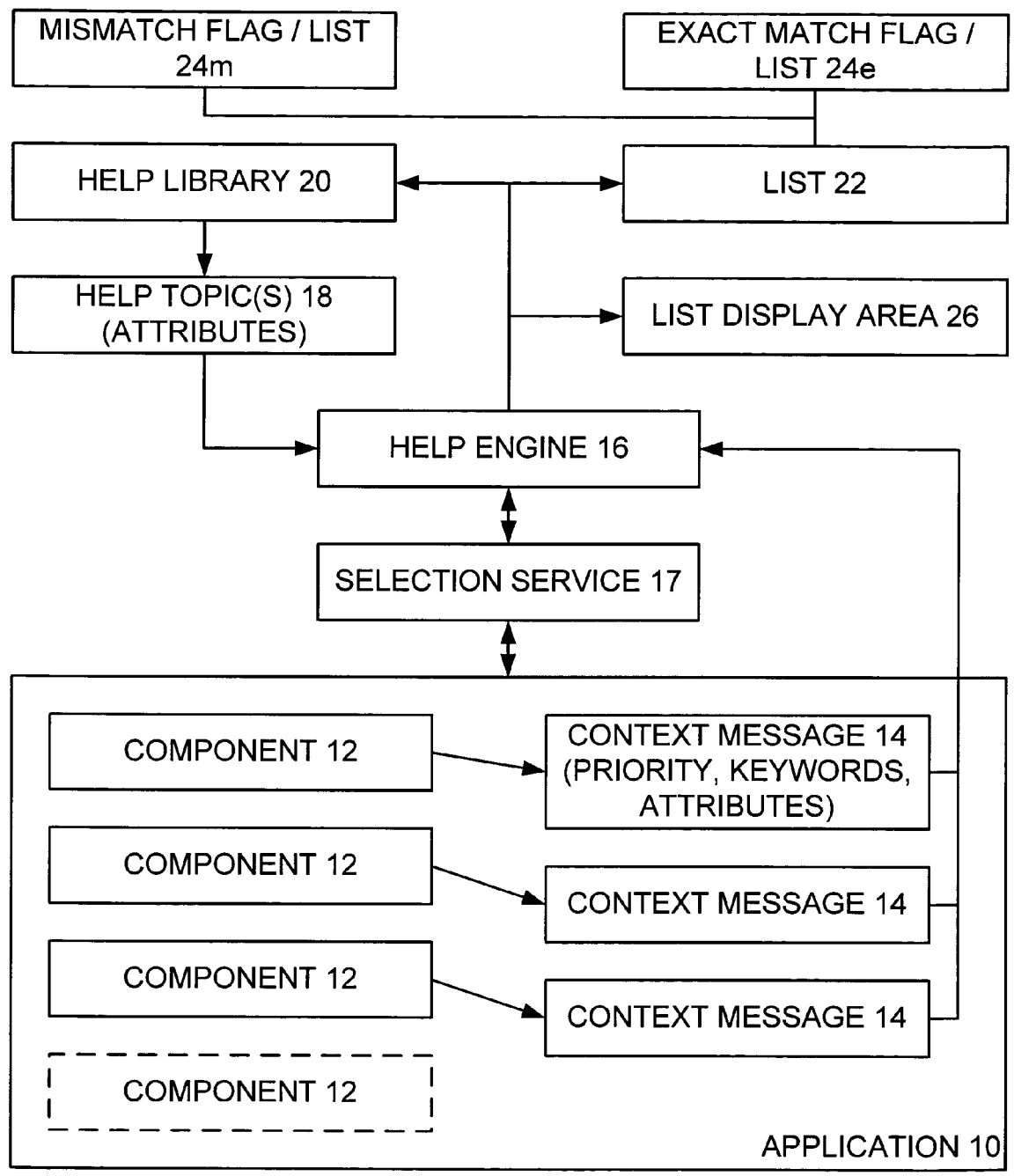
FIG. 2 is a block diagram showing the structure of a context-based help system in accordance with one embodiment of the present invention.

In the present invention, and referring now to FIG. 2, a user employs an application 10 or the like by way of a computer such as the computer 120 of FIG. 1 or the like. The application 10 may be any appropriate application without departing from the spirit and scope of the present invention. For example, the application 10 may be a drawing application, a word processing application, a controller, or even an operating system. Also, the application 10 may be operating on the computer 120 or may be operating remotely from the computer 120 without departing from the spirit and scope of the present invention. While it is to be appreciated that the present invention is particularly suited for a relatively complex application 10, the application 10 may instead be relatively simple, again without departing from the spirit and scope of the present invention.

As seen in FIG. 2, the application 10 includes one or more components 12. As may be appreciated, the components 12 of the application 10 vary from application 10 to application 10, and in essence work together to perform and/or effectuate the various functions incumbent in the application 10. For example, the components 12 may include a library of selectable elements, a selection device for selecting elements from the library, a rendering device for rendering a selected element, a tray for holding the selected element, a tray organizer for organizing multiple ones of the tray, etc. Note that a component 12 may be more conceptual (a tray, for example) or may be more concrete (a library, for example) without departing from the spirit and scope of the present invention.

In one embodiment of the present invention, each of at least some of the components 12 of the application 10 is constructed or enabled to describe a current context of the component 12 by providing a context message 14 having a description of the current context of such component 12. Note that a context message 14 may include a pointer or linkage to information contained elsewhere, where such information is in effect a sub-context message 14 as provided by a sub-component 12 of the component 12. In one embodiment of the present invention, the current context as represented by a context message is described by way of string-based keywords and/or name/value attribute pairs. As should be appreciated, though, the current context of a component 12 as set forth in a corresponding context message 14 may be described in other forms without departing from the spirit and scope of the present invention.

Note that the keywords and attributes in a context message 14 are specific to the corresponding component 12 and thus vary from component 12 to component 12. Moreover, the keywords and attributes in a context message 14 from a component 12 may vary based on the current context of the component 12. Further, the keywords and attributes may be supplied in a manner decided upon by the corresponding component 12, or in a manner decided upon by an entity external to the corresponding component 12. At any rate, the keywords and attributes in a context message 14 may be any appropriate keywords and attributes without departing from the spirit and scope of the present invention, as long as such keywords and attributes provide information from which the current context of the corresponding component may be deduced.

Each component 12 of the application 10 is responsible for creating and maintaining its own context message 14. That is, the component 12 updates the context message 14 thereof with new keywords and/or attributes and removes old keywords and/or attributes to reflect actions taken by the user. A context message 14 from a component 12 may contain keywords only, attributes only, or some combination of the two. As will be explained in more detail below, the keywords in a context message 14 are employed to locate help topics, and the attributes in a context message are employed to filter and prioritize the located topics. Each context message 14 may be static or dynamic. In the latter case, the context message 14 is based on current conditions with regard to the corresponding component 12, and represents a current context of such component 12.

It is to be appreciated that not every component 12 is active at all times while an application is in operation. For one example, in a word processing application 10 that can operate on multiple document components 12, only one document component 12 is being worked on (i.e., is 'in focus') at a time. For another example, only one thesaurus library component 12 might be used at any one time. Conversely, some components 12 are active at all times. For one example, in the aforementioned word processing application 10, a document selection manager component 12 is always operating to be able to select a document to be in focus. For another example, a thesaurus selection manager component 12 is always operating to select a particular thesaurus for use. Accordingly, it is to be appreciated that the overall current context of an application 10, at least for purposes of generating help in connection therewith, should be based on the components 12 that are currently active or operating (i.e., 'in focus'), and not on other components 12 that are either not active or operating or are idle (i.e., 'out of focus').

In the present invention, then, each component 12 that is in focus provides a context message 14 describing the context of such component 12 to a help engine 16, and the help engine 16 dynamically builds the current overall context of the application 10 based on such provided context messages 14. In particular, as each component 12 comes into focus, such component 12 provides the corresponding context message 14, and the help engine 16 incorporates such context message 14 with other context messages 14 from other in-focus components 14 to dynamically build the current overall context of the application 10. Correspondingly, whenever a component 12 goes out of focus, the corresponding context message 14 is removed from the purview of the help engine 16 and the current overall context is re-built. Thus, the help engine 16 maintains the current overall context of the application 10 in an accurate and up-to-date manner, where such current overall context shows which components 12 the user is accessing and what the user is doing within each accessed component 12.

Figure 3:
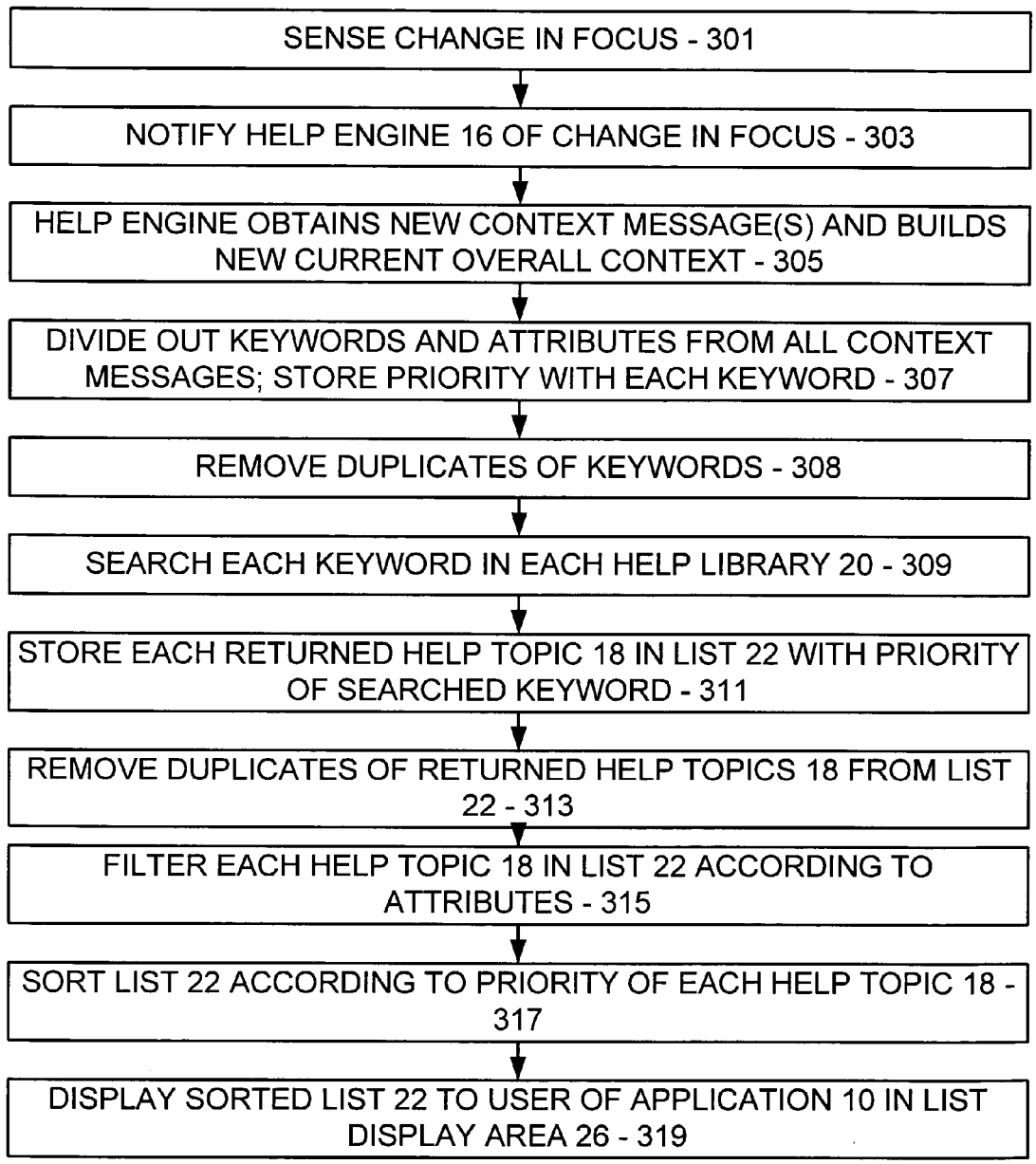
FIG. 3 is a flow diagram showing a method performed in connection with the help system of FIG. 2 in the course of providing dynamic help to a user in accordance with one embodiment of the present invention.

In one embodiment of the present invention, the application 10 and/or the computer 120 includes a selection service 17 that senses whenever a change of focus occurs in the application 10 (step 301, FIG. 3), and the selection service 17 notifies the help engine 16 of such change and in particular which components 12 have been affected by the change (step 303, FIG. 3). Thereafter, based on the change, the help engine 16 discards appropriate ones of the context messages 14 and/or obtains from each of appropriate ones of the components 12 a new context message 14 therefrom (step 305, FIG. 3). Of course any other appropriate methodology for obtaining context messages 14 may be employed without departing from the spirit and scope of the present invention.

Significantly, based on the built current overall context, the help engine 16 retrieves help topics 18 from one or more help libraries 20, evaluates and prioritizes the retrieved topics 18, and displays linkages to the topics 18 based on the prioritization. Such linkages may for example appear to the user in a portion of the monitor 147 (FIG. 1) of the computer 120. As may be appreciated, each help engine 16 may be local to or remote from the application 10. Likewise, the help libraries 20 may be local to or remote from the application 10 and/or help engine 16. In the event that the help engine 16 and or help libraries 20 are remote from the application 10, appropriate communicative links are required. Such links may be established in any appropriate manner, such as for example by a direct connection, Internet connection, Intranet connection, etc.

In one embodiment of the present invention, the help engine 16 retrieves the help topics 18 from each help library 20 based on the keywords from the context messages 14 from the in-focus components 12. In addition, the help engine evaluates and prioritizes the retrieved topics 18 based on the attributes from the context messages 14 from the in-focus components 12. The displayed linkages to the help topics 18 should be sorted from most relevant to least relevant.

As may be appreciated, by combining current contexts from multiple in-focus components 12 by way of the context messages 14 therefrom to form a current overall context of the application 10, the help topics 18 retrieved and prioritized by the help engine based on such current overall context better represent the range of help issues that the user of the application 10 may wish to review. Especially in a complex application that can have many different components 12 in focus at any one time, the current overall context as derived by the help engine 16 results in a range of help topics 18 made available to the user that represent not only the current activity of the user but also the current overall posture of the application 10 as employed by the user.

In one embodiment of the present invention, the help engine prioritizes help topics 18 based on a priority level attached to each context message 14 (FIG. 2), where the priority level represents a priority attached to the corresponding component 12. Attaching a particular priority to a particular component 12 may be done based on any particular criteria without departing from the spirit and scope of the present invention, as long as the priority of each component 12 bears some logical. For example, and in one embodiment of the present invention, the priority of each component 12 is based on the level of detail with which such user interacts with the component 12. Thus, a component 12 that the user is currently working with is given a relatively higher priority, while a shell component 12 is given a relatively lower priority. As may be appreciated, prioritizing each context message 14 allows the help engine 16 to match the current overall context very closely to what the user is actually doing with the application, no matter how complex that may be.

In particular, and assuming a relatively complex application 10 for working on multiple projects based on tools available from multiple libraries, it may be the case that the following components 12 are in focus, from least level of detail to most level of detail: a shell, a solution, a project manager, a project item, an editor, an editor selector, a tool library, and a tool selector. Thus, for each component 12, the following priority may be assigned:

| COMPONENT 12 | PRIORITY |
| --- | --- |
| SHELL | 100 |
| SOLUTION | 200 |
| PROJECT MANAGER | 300 |
| PROJECT ITEM | 400 |
| EDITOR | 500 |
| EDITOR SELECTOR | 600 |
| TOOL LIBRARY | 900 |
| TOOL SELECTOR | 1000 |

The context message 14 from the editor selector component 12 thereby includes a priority level of 600, the context message 14 from the tool selector component 12, includes a priority level of 1000, etc.

Suppose a user of the application 10 with the components 12 as set forth above has created a solution that includes a project item including tools from a tool library, and the user is working on a form within the project item with selection in the form on a button control. Then suppose that the user shows the tool selector and places selection on an item. In this scenario, each component 12 that is in focus provides a context message 14 to the help engine 16, where the context messages 14 are as follows:

| COMPONENT 12 | PRIORITY | KEYWORDS/ATTRIBUTES |
| --- | --- | --- |
| SHELL | 100 | keyword=Ambient<br>attribute product=vb<br>attribute ShellMode=Design |
| SOLUTION | 200 | |
| PROJECT MANAGER | 300 | |
| PROJECT ITEM | 400 | attribute project=exe<br>attribute ProjType=LocalProj<br>attribute Item=vb<br>attribute Item=Project<br>attribute Devlang=VB<br>attribute SourceControl=FALSE |
| EDITOR | 500 | Keyword=Designer_System . Windows . Forms . Design . FormDocumentDesigner |
| EDITOR SELECTOR | 600 | Keyword=System . Windows . Forms . Button |
| TOOL LIBRARY | 900 | Keyword=VS. Toolbox |
| TOOL SELECTOR | 1000 | Keyword=System . Windows . Forms . TextBox |

Note that not all context messages 14 from components 12 include both attributes and keywords, and that in fact some include neither. Based on the context messages 14 above, the user has multiple projects, but the VB project is the active one as reflected by the 'product' attribute. Other attributes such as 'projtype' and 'project' provide additional information about what the user is working on.

Based on the context messages 14 as received by the help engine 16, and referring now to FIG. 3, the help engine 16 divides out the keywords and the attributes (step 307), as follows:

| PRIORITY | KEYWORD |
|---|---|
| 100 | Ambient |
| 500 | Designer_System . Windows . Forms . Design. FormDocumentDesigner |
| 600 | System . Windows . Forms . Button |
| 900 | VS . Toolbox |
| 1000 | System . Windows . Forms . TextBox |

ATTRIBUTES attribute product=vb
attribute ShellMode=Design
attribute project=exe
attribute ProjType=LocalProj
attribute Item=vb
attribute Item=Project
attribute Devlang=VB
attribute SourceControl=FALSE Notably, in organizing the keywords and attributes, the help engine 16 need not retain any indication of the component 12 from which the keyword or attribute originated. However, and as will be explained in more detail below, the help engine should identify each keyword with the priority of the component 12 from which the keyword originated. Also notably, in organizing the keywords and attributes, duplicates of keywords and attributes are removed (step 308). In the case of duplicate keywords, the one having the highest priority may be kept.

In one embodiment of the present invention, the help engine 16 employs each keyword of the current overall context as a search in each help library 20 (step 309), where each search results in one or more help topics 18 returned to the help engine 16. Note that each returned help topic 18 may be a record of the entire help topic 18 or a pointer or linkage device to the entire help topic 18. For each returned help topic 18, then, the help engine 16 stores such help topic 18 in a list 22 along with the priority of the keyword that was the basis of the search that resulted in such help topic 18 (step 311). Note that the list 22 includes all help topics 16 returned from all searches of all keywords in all help libraries 20. As will be explained below, the priority of each help topic 18 in the list 22 can later be employed to prioritize all the help topics 18 within the list 22.

Once the help engine 16 has searched all keywords of the current overall context in all help libraries 20 to form a complete list 22 of returned help topics 18, the list 22 may first be examined to remove duplicates of returned help topics (step 313). Alternatively, duplicates maybe removed as the list 22 is being compiled. In either case, when removing a duplicate of a help topic 18 from the list 22, the one having the highest priority may be kept.

Each help topic 18 in the complete non-duplicate list 22 is then filtered according to the attributes of the current overall context (step 315). As may be appreciated, filtering is usually if not always necessary especially inasmuch as all of searches of all of the keywords in all of the help libraries likely will result in the list 22 of returned help topics 18 being very long. In fact, in such long list 22, many of the returned help topics likely have minimal if any relevance or interest to the user.

Figure 4:
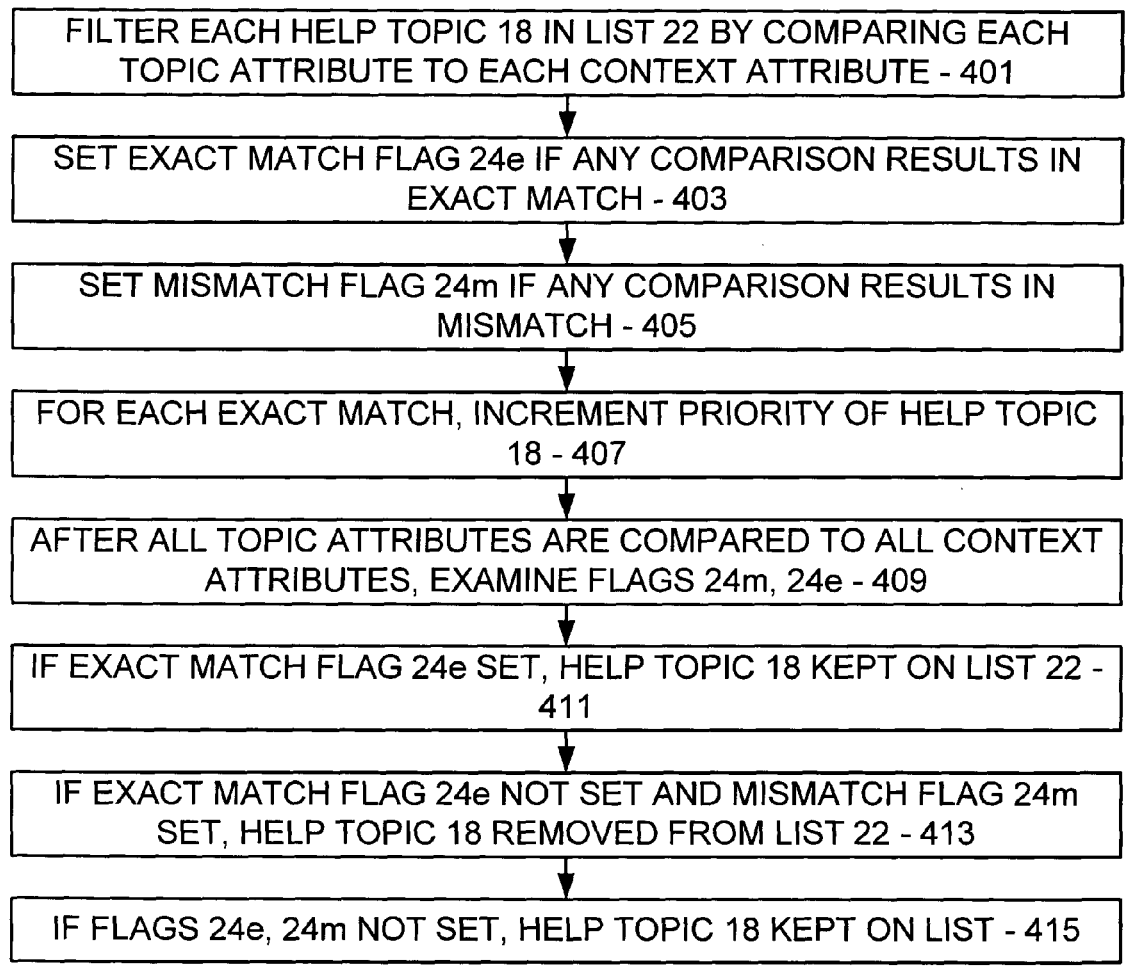
FIG. 4 is a flow diagram showing steps performed in connection with the method of FIG. 3 in culling returned help topics according to context attributes in accordance with one embodiment of the present invention.

In one embodiment of the present invention, and similar to each context message 14, each returned help topic 18 includes a set of attributes. Thus, in one embodiment of the present invention, and as seen in FIG. 4, the help engine 16 filters each help topic 18 in the list 22 by comparing each attribute of the current overall context ('context attribute') to each attribute of the help topic 18 ('topic attribute') (step 401). Bearing in mind that each attribute includes a name and a value, each attribute comparison can have one of three results: an exact match, where the name and value of the topic attribute matches the name and value of the context attribute; a mismatch, where the name of the topic attribute matches the name of the context attribute but the value of the topic attribute differs from the value of the context attribute; and a non-match, where the name of the topic attribute differs from the name of the context attribute.

In general, filtering works as follows. Each help topic 18 that results in an exact match is kept on the list 22. Moreover, and in one embodiment of the present invention, each time a help topic 18 experiences an exact match, the corresponding priority of the help topic 18 is incremented a certain amount. Such amount may be by 1, by 10, or any other appropriate value. In one embodiment of the present invention, the increment amount is chosen such that matching a large number of attributes does not rearrange the help topics 18 from their initial keyword-based priorities. That is, if a first help topic 18 has an initial relatively lower priority and a second help topic 18 has an initial relatively higher priority, the first help topic 18 should never achieve an incremented priority beyond that of the second help topic 18. In another embodiment of the present invention, the increment amount is chosen such that matching a large number of attributes can rearrange the help topics 18 from their initial keyword-based priorities.

As discussed below, the final list 22 is sorted by priority from most relevant to least relevant, and accordingly, incrementing the priority of any help topic 18 may affect the position of such help topic 18 within the sorted list 22. Moreover, it has been found at least empirically that incrementing the priorities of help topics 18 while filtering results in a sorted list 22 that is significantly more relevant to the user.

Each help topic 18 that results in a non-match is also kept on the list 22. While keeping a non-match may seem counter-intuitive, it must be remembered that a non-match help topic 18 isn't necessarily irrelevant. Instead, a non-match help topic 18 is best characterized as having indeterminate relevance. Moreover, and in one embodiment of the present invention, a non-match help topic 18 is not incremented. Accordingly, a non-match help topic 18 and an exact match help topic 18 of same original priority will after filtering be prioritized correctly, at least with regard to each other.

A help topic 18 that results in one or more mismatches and no exact matches is removed from the list 22. Put another way, a help topic 18 with topic attributes that are not an exact match for any context attribute and yet are a mismatch for one or more context attributes may be described as being positively identified as irrelevant, and therefore need not be kept on the list. However, and importantly, in identifying a help topic 18 as resulting in a particular mismatch, the help topic 18 should not be removed from the list 22 immediately on the chance that such help topic 18 may later result in an exact match.

Accordingly, in one embodiment of the present invention, during examination of each help topic 18, an exact match flag 24e and a mismatch flag 24m are employed. In particular, while examining each help topic 18, the exact match flag 24e is set if any attribute thereof results in an exact match (step 403), and the mismatch flag 24m is set if any attribute thereof results in a mismatch (step 405). Processing of the help topic 18 with the corresponding mismatch and exact lists 24*m*, 24*e* and the list 22 is as follows. For each attribute of the help topic 18, an exact match increments the priority of such help topic 18 (step 407), as was discussed above, and causes setting of the exact match flag 24*e* (step 403). Similarly, for the attribute of the help topic 18, a mismatch causes setting of the mismatch flag 24*m* (step 405).

Once all the topic attributes of the help topic 18 have been compared to the context attributes, the flags 24*m*, 24*e* are examined (step 409). In particular, if the exact match flag 24*e* is set, the help topic 18 is kept on the list 22 regardless of the state of the mismatch flag 24*m* (step 411). However, if the exact match flag 24*e* is not set and the mismatch flag 24*m* is set, the help topic 18 is a 'pure' mismatch and is removed from the list 22 (step 413). Notably, if neither flag 24*e*, 24*m* is set, the help topic 18 is a non-match and is kept on the list, as was discussed above (step 415).

Figure 5:
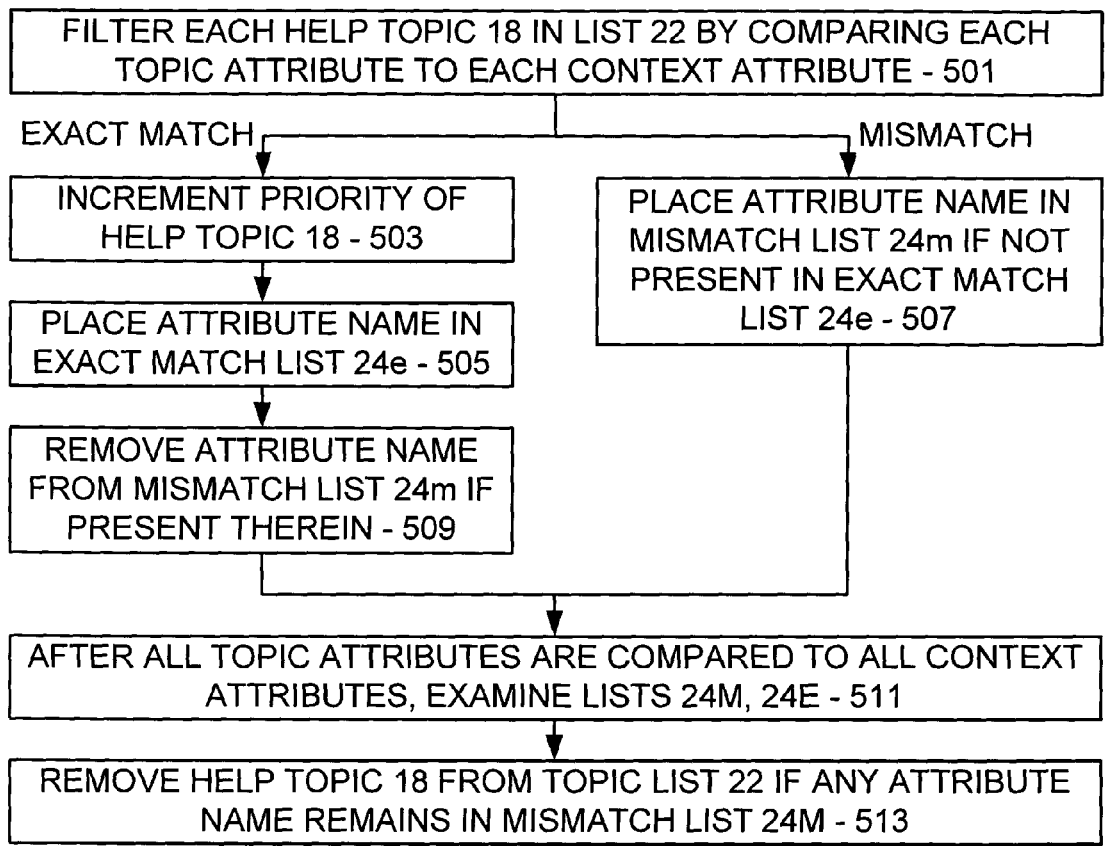
FIG. 5 is a flow diagram showing steps performed in connection with the method of FIG. 3 in culling returned help topics according to context attributes in accordance with another embodiment of the present invention.

In another embodiment of the present invention, and referring now to FIG. 5, the help engine 16 also filters each help topic 18 in the list 22 by comparing each context attribute to each topic attribute (step 501). However, each help topic 18 that results in an exact match is kept on the list 22 unless the help topic 18 results in a mismatch with regard to an attribute and not an exact match with regard to the same attribute. That is, even if the help topic 18 results in an exact match, the help topic 18 is removed if a topic attribute thereof results in a mismatch with a context attribute and no exact match with the same context attribute. Such an action is based on the presumption that the mismatched and not exact matched attribute positively identifies the help topic 18 as irrelevant despite any exact matched with regard to such help topic 18, and therefore need not be kept on the list.

Importantly, and similar to before, in identifying an attribute of a help topic 18 as resulting in a particular mismatch, the help topic 18 should not be removed from the list 22 immediately on the chance that such attribute of such help topic 18 may later result in an exact match. Accordingly, in one embodiment of the present invention, during examination of each help topic 18, an exact match list 24*e* and a mismatch list 24*m* are employed (FIG. 1). In particular, while examining each help topic 18, and while examining each topic attribute thereof, if the attribute results in an exact match, the priority of such help topic 18 is incremented (step 503), as was discussed above, and the attribute name is placed in the exact match list 24*e* (step 505). Names are never removed from the exact match list 24*e*. If the attribute results in a mismatch, and the attribute name is not already in the exact match list 24*e*, the attribute name is placed in the mismatch list 24*m* (step 507). In addition, as an attribute name is placed in the exact match list 24*e* (step 505), the mismatch list 24*m* is examined to determine if the attribute name exists therein. If so, the attribute name is removed from the mismatch list 24*m* (step 509).

Once all topic attributes of the help topic 18 have been compared to the context attributes, the lists 24*m*, 24*e* are examined (step 511). In particular, if any attribute names remain in the mismatch list 24*m*, then the help topic 18 is removed from the topic list 22 (step 513).

As should be appreciated, other methods of identifying a mismatch help topic 18 to be removed from the list 22 may be employed without departing from the spirit and scope of the present invention.

It is to be noted that in the course of searching and filtering help topics 18 according to keywords and context attributes, a help topic 18 may result from a search of a keyword from a context message 14 of a first component 12, and may be filtered according to a context attribute from a context message 14 of a second component 12. Empirically, it has been found that such 'cross-pollination' of keywords and context attributes across components 12 ultimately results in a better list 22 of searched and filtered help topics 18.

Once each help topic 18 has been examined in the manner set forth above, and returning now to FIG. 3, the list 22 hopefully has been culled significantly, and each remaining help topic 18 on such list has been prioritized according to the keyword that resulted in such help topic 18 and each exact match of a topic attribute thereof to a context attribute. The list 22 of help topics 18 may then be sorted according to the priority of each help topic 18 (step 317), from highest priority to lowest priority, and the sorted list 22 may then be displayed to the user of the application 10 in a list display area 26 on a monitor 147 (FIG. 1) of the computer 120 (step 319). Thus, the displayed list 22 in the list display area 26 is available to be perused by the user for help topics 18 that have already been determined to be relevant to the current overall context of the application 10. If each help topic 18 is a record of the entire help topic 18, the user can review a particular help topic 18 directly, while if each help topic 18 is pointer or linkage device to the entire help topic 18, the user can actuate the linkage for a particular help topic 18 and then review such help topic 18.

As should now be appreciated, the displayed list 22 of help topics 18 in the list display area 26 remains until the user changes focus in the application 10. As should also now be appreciated, at such time, a new current overall context is built based on the change in focus of the application as determined by the selection service 17 (steps 305–308), the help engine again searches each help engine 16 for help topics 18 based on keywords from the new current overall context (steps 309–313), culls and prioritizes each found help topic based on the attributes of the new current overall context (steps 315, 401–415), and sorts and displays a new list 22 of help topics 18 to the user in the list display area 26 (steps 317, 319).

As should be appreciated, and importantly, the present invention encompasses dynamically providing resources other than and/or in addition to help based on current overall context. Accordingly, in the present invention, help topics 18 includes not only help topics but samples, suggested next steps, suggested templates, suggested libraries, and the like, all based on current overall context. In addition, help topics 18 may include links that initiate actions for the user, such as invoking a wizard, running a macro, etc. The list display area 26, then, may include not only help topics 18, but other topics as well, all appropriately sorted and/or organized.

Moreover, the display area 26 may additionally include links that are not topics. For example, suppose in connection with an application 10 that several projects are integrated with several different source control systems. In such case, macros can be written to intelligently handle check-in/check-out of the current file in the correct system. Especially if the application 10 has no built-in support for such functionality, links could be created to appear in the display area 26 such that the right check-in/check-out macro is made available based on the kind of file being edited. In this example, the display area 26 doesn't display a link to a topic of any kind, but instead provides easy and fast access to a product functionality and custom add-in/macro functionality.

Help Architecture

Figure 6:
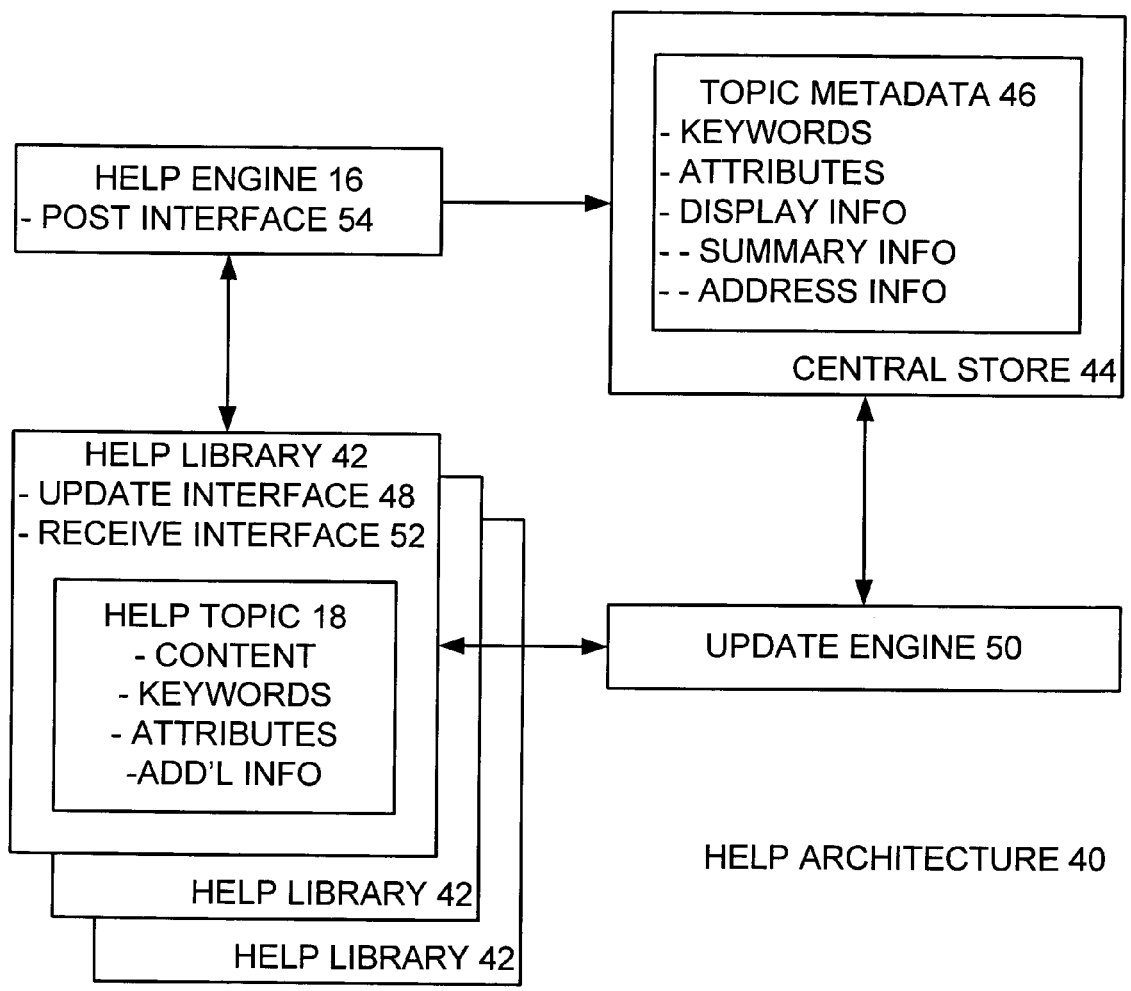
FIG. 6 is a block diagram showing a help architecture to be employed in connection with the help system of FIG. 2 in accordance with one embodiment of the present invention.

Turning now to FIG. 6, another overall goal of the present invention is to provide a help architecture 40 that facilitates providing help from one or more local and/or remote help libraries 42 based on the current overall context of the application 10. To deliver help quickly and efficiently, and in one embodiment of the present invention, the architecture 40 includes a central store 44, and each of the help libraries 42 within the architecture 40 periodically delivers to the central store 44 topic metadata 46 corresponding to help topics 18 available from such help library 42.

Notably, in the present invention, the central store 44 may be remote from the help engine 16, whereby the central store 44 is in fact accessible by each of a plurality of help engines 16, and each help library 42 may likewise be remote from the central store 44. Of course, the central store 44 may also be local to a particular help engine 16 and each help library 42 may likewise be local to the central store 44 without departing from the spirit and scope of the present invention.

Figure 6A:
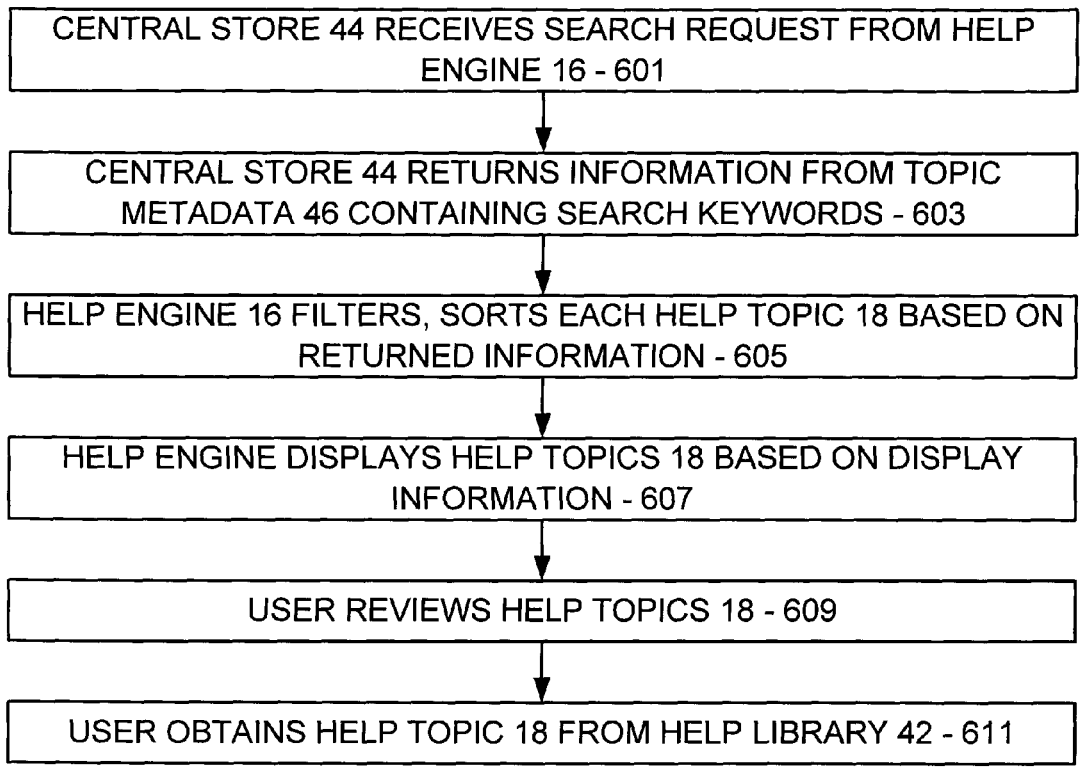
FIGS. 6A, 7, and 8 are flow diagrams showing key steps performed in connection with the help architecture of FIG. 6 including searching for help topics from help libraries by way of a central store (FIG. 6), updating the central store from the help libraries by way of an update engine (FIG. 7), and posting a help topic to a help library (FIG. 8).

In particular, for each help topic 18 that is available from a particular help library 42, the corresponding topic metadata 46 from such help library 42 provides a summary or abstract of the help topic 18, search keywords, and information on how to access the help topic 18. Thus, in the course of the help engine 16 (FIG. 2) searching help libraries 20, 42 as at step 309 of FIG. 3, and turning now to FIG. 6A, the help engine 16 sends a search request to the central store 44 of the help architecture 40 and the central store 44 receives same (step 601). Based on all of the topic metadata 46 from each help library 42 in the help architecture 40 and based on the keywords of the search, then, the central store 44 returns information from topic metadata 46 containing the search keywords (step 603). As may be appreciated, and similar to that which was set forth above, each piece of topic metadata 46 corresponding to a help topic 18 available from a help library 42 includes a set of keywords relating to the corresponding help topic 18.

Thus, rather than the user retrieving help topics 18/topic metadata 48 from each of several help libraries 42, the architecture 40 of the present invention allows the user to retrieve such information from the central store 44 as a single source. As a result, retrieval time is substantially improved, perhaps even to the point where help topics 18/topic metadata 46/returned information from topic metadata 46 are available in real-time or near-real-time.

As may be appreciated, and similar to that which was set forth above, each piece of topic metadata 46 corresponding to a help topic 18 available from a help library 42 includes a set of attributes relating to the corresponding help topic 18, and the returned information from the piece of topic metadata 46 also has such set of attributes. Thus, and as with the steps shown in FIGS. 4 and 5, the help engine 16 filters each help topic 18 by comparing each attribute of the current overall context ('context attribute') to each attribute of the help topic 18 ('topic attribute') as obtained from the returned information from the corresponding topic metadata 48 (step 605). Inasmuch as the details of such filtering are already set forth above in connection with FIGS. 4 and 5, such details need not be repeated here except as noted.

Once filtered and sorted, the help topic 18 corresponding to the returned information from each piece of topic metadata 46 as obtained from the central store 44 that is to be displayed to the user as at step 319 of FIG. 3 is in fact displayed based on appropriate display information from the corresponding topic metadata 48 and returned information (step 607). In one embodiment of the present invention, the display information includes summary information that provides a summary that is to be displayed, and address information including an address from which the corresponding help topic 18 may be obtained from the corresponding help library 42 or from another source. As should be appreciated, the summary information may include information in the nature of a title, author, abstract or the like, and other information regarding the help topic 18. As should also be appreciated, the address information may be a URL (Universal Resource Locator) or the like. Thus, the user can review the summary information to determine whether the corresponding help topic 18 is of further interest (step 609), and if so the user can employ the address information to obtain and/or review such help topic 18 from the corresponding help library 42 or other source (step 611).

It is to be noted that although the present invention has heretofore been set forth in terms of a single central store 44 that has topic metadata 46 from a plurality of help libraries 42, a plurality of central stores 44 could also be employed, each working with all help libraries 42 or with a subset thereof without departing from the spirit and scope of the present invention. Similarly, each central store 44 could have topic metadata 46 from only a single help libraries 42 without departing from the spirit and scope of the present invention.

As may be appreciated, each help library 42 may or may not be operated by an entity separate from the entity operating the central store 44. In either case, the central store 44 and each help library 42 must cooperate to periodically update or freshen (hereinafter 'update') the topic metadata 46 at the central store 44 from the help library 42. Such periodicity may be any appropriate duration without departing from the spirit and scope of the present invention. For example, such periodicity may be hourly, daily, weekly, etc. Of course, such periodicity should not be so long that the topic metadata 46 at the central store 44 becomes overly stale, and should not be so short that updating and freshening becomes a continuous process.

As may also be appreciated, updating may take any appropriate form without departing from the spirit and scope of the present invention. For example, such updating may comprise a complete download of all topic metadata 46 relevant to the help library 42 from such help library 42 to the central store 44. Alternatively, such updating may comprise only a download of 'delta' information representing that which has changed since the last update. In the latter case, it may be that the topic metadata 46 is set forth in a hierarchical format such as an extensible markup language (XML), and the delta is a hierarchical document set forth in a hierarchical differential language.

In one embodiment of the present invention, and as seen in FIG. 6, each help library 42 has an update interface 48 for supporting a request for an update, and the architecture has an update engine 50 for requesting an update from each of the help libraries 42, for receiving the update, and for storing the update in the central store 44. Note that such update engine 50 may also be a part of the central store 44 without departing from the spirit and scope of the present invention.

Figure 7:
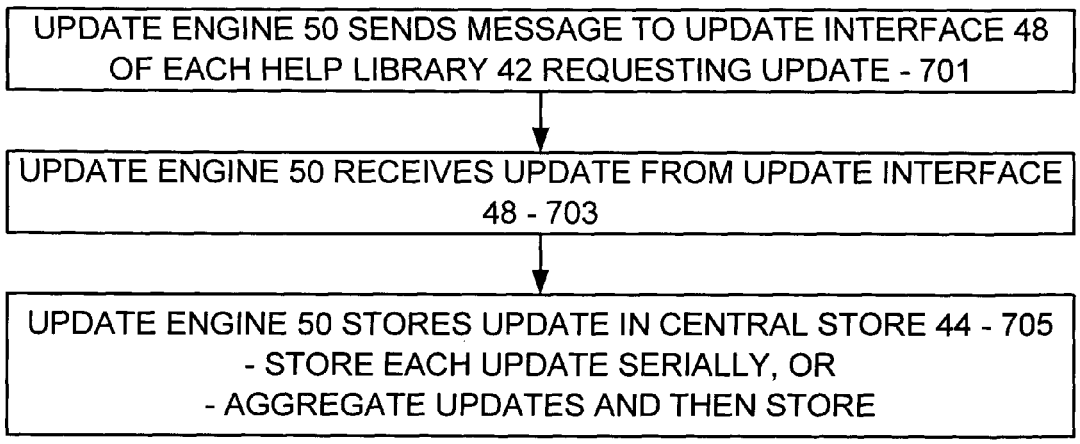

Turning now to FIG. 7, it is to be appreciated that the update engine 50 operates as follows. Preliminarily, it is to be understood that the update engine 50 periodically queries each help library 42 for any updates regarding help topics 18 available therefrom, where such update engine 50 is triggered to do so either by itself, by the central store 44, or by another entity. Regardless off the triggering source, the update engine 50 sends a message to the update interface 48 of each help library 42 requesting any available update from such help library 42 (step 701).

In response to the request, the update interface 48 obtains any available update and returns same for receipt by the update engine (step 703). As set forth above, the update may comprise a complete version of all topic metadata 46 available from the help library 42, or may only be a delta version showing only changes since a previous update. As may be appreciated, the update interface 48, the help library 42, or the help engine 50 tracks the last time an update took place, and whether the information in the help library 42 has changed since then. In addition or in the alternative, the help engine 50 may be provided with a complete version upon requesting same.

As should be appreciated, either the update interface 48 or the help library 42 itself generates the topic metadata 46 that is the basis of the update. Thus, the information that comprises the topic metadata 46 for each help topic 18 as maintained by the help library 42 should be obtainable from such help topic 18. In particular, each help topic 18 as stored at the help engine 42 should include therewith a predefined set of keywords relating to the help topic 18, a predefined set of attributes relating to the help topic 18, display information including summary information that provides a summary that is to be displayed, and address information including an address from which the help topic 18 may be obtained.

Upon receiving the update from the update interface 48 of the help library 42, the update engine 50 may store such update in the central store 44 (step 705). Note that such update engine 50 may either store the update from each help library 42 serially, or may aggregate the updates from multiple help libraries 42 and then store the aggregated updates. Once stored, the topic metadata 46 incumbent in the update is then available to generate return information as appropriate in response to requests for help topics from the help engine 16 of the user.

In one embodiment of the present invention, and in connection with the architecture 40 of FIG. 6, a user can not only receive help topics 18 from help libraries 42 but can also create help topics 18 and post same to one or more of the help libraries 42. Thus, the help libraries 42 are supplied with new help topics 18 from users as such users encounter new situations and document same. For example, a user who discovers a new way to use an application 10 can compose a help topic 18 to document same and then post the composed help topic 18 to a help library 42 to be available to other users.

To accommodate such an event, then, and in one embodiment of the present invention, each help library 42 has a receive interface 52 for receiving a posted help topic 18 from the user, and the user's help engine 16 includes a complementary post interface 54 for assisting the user in posting the composed help topic 18 to the help library 42 by way of the receive interface 52 thereof.

Figure 8:
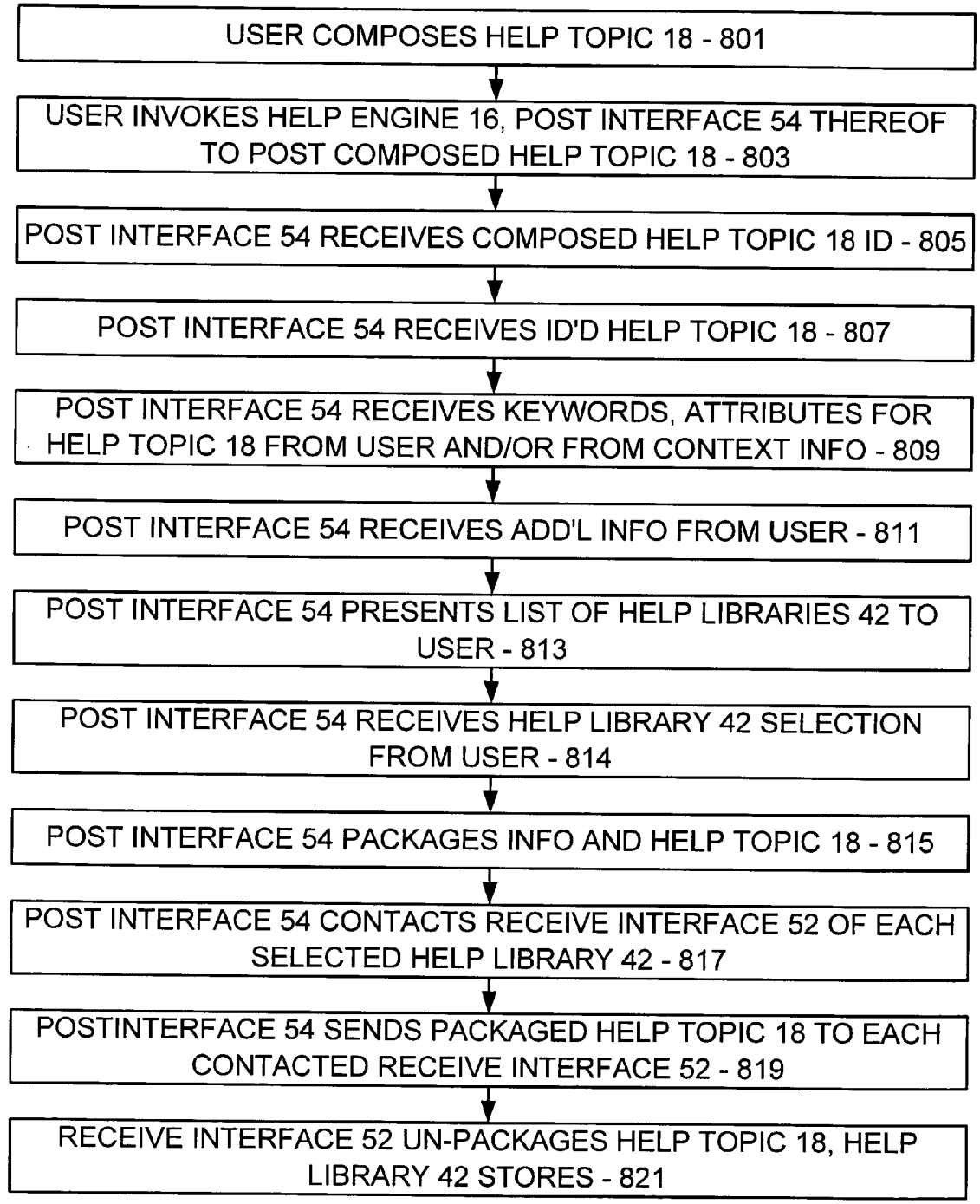

Turning now to FIG. 8, it is to be appreciated that a user posts a help topic 18 as follows. Preliminarily, it is to be understood that the user composes the to-be-posted help topic 18 by way of an appropriate editor to include text and perhaps additional materials such as pictures and audio (step 801), and then invokes the help engine 16 and the post interface 54 thereof to assist in posting the composed help topic 18 (step 803). Such post interface 54 then prompts the user to identify the composed help topic 18, perhaps as a file or a copied or highlighted block of data (step 805), and receives the identified help topic 18 (step 807).

In addition, the post interface 54 may prompt for and receive from the user any keywords and/or attributes to be ascribed to the identified help topic 18 and/or may detect and receive from a current context of the application 10 a set of such keywords and/or attributes (step 809). Note that in the latter case the user may wish to prohibit such a function out of privacy concerns. At any rate, the post interface 54 may also prompt for and receive from the user additional information relating to the identified help topic 18, including a title, a summary or abstract, an author, and the like (step 811). Also, the post interface 54 may present to the user a list of help libraries 42 that are amenable to receiving a posted help topic 18 (step 813), and receives from the user a selection of one or more of such amenable help libraries 42 as recipients of the identified help topic 18 (step 814).

Thereafter, and once all information relating to the identified help topic 18 has been collected, the post interface 54 packages such information and identified help topic 18 in an appropriate format (step 815), contacts each selected help library 42 by way of the receive interface 52 thereof (step 817), and sends the packaged help topic 18 thereto (step 819). Upon receiving the packaged help topic 18, the receive interface 52 of the help library 42 may un-package same, the help library 42 may appropriately store same therein as a posted help topic 18 (step 821). Note that prior to such storage, it may be that an editor or administrator or the like reviews the posted help topic 18 for content, style, propriety, and the like, and reviews the keywords and attributes associated therewith in a similar manner. As may now be appreciated, upon posting in such help library 42, such posted help topic 18 is now available for being sent to the central store 44 as corresponding topic metadata 46, whereby any user can access such posted help topic 18 in the manner set forth above.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful help engine that provides dynamic help to a user of an application 10 based on the current overall context of the application 10. The help engine 16 provides dynamic help that updates when the current overall context of the application 10 changes, models such current overall context, and obtains, prioritizes, and displays help topics 18 based thereon, whereby the displayed help topics are of interest and help to the user. The help architecture 40 allows the help engine to obtain help from one or more help sources 20, 42.

It should be appreciated that changes could be made to the embodiments described above without departing from the inventive concepts thereof. Most significantly, although the present invention is most useful in situations where multiple remote help libraries 42 are available, it is to be appreciated that the present invention is also equally applicable is situations where multiple local help libraries 20, 42 are available, too, in which case the central store 44 and update engine 50 may also be local. It should be understood, therefore, that this invention is not limited to the particular embodiments disclosed, but it is intended to cover modifications within the spirit and scope of the present invention as defined by the appended claims.

The invention claimed is:

1. A help architecture in support of an application and a help engine operating on a computer, the help engine for locating help topics relevant to the application, the help architecture comprising:

a plurality of help libraries, each help library storing a plurality of help topics therein, the help topics being accessible to a user from the help libraries by way of the computer; and a central store storing a plurality of pieces of topic metadata, each piece of topic metadata corresponding to one of the help topics accessible from the help libraries, the central store in response to a search request from the help engine locating topic metadata relevant to the search request and returning information from the located topic metadata, the search request including search keywords, each piece of topic metadata in the central store including a set of keywords by which the help topic can be searched for and a set of attributes by which the help topic can be filtered, and the central store returning to the requesting help engine information from located pieces of topic metadata containing the search keywords, the returned information corresponding to each located piece of topic metadata and including a summary of the corresponding help topic, a set of attributes relating to the corresponding help topic, and an address by which the corresponding help topic may be located in the corresponding help library, whereby the help engine filters each located piece of topic metadata based on the set of attributes thereof and displays information relating to each filtered piece of topic metadata to the user, the displayed information for each piece of topic metadata including the summary of the corresponding help topic and the address by which the corresponding help topic may be located in the corresponding help library, and whereby the user may review the displayed summary of each help topic and if desired based thereon access the corresponding help topic from the corresponding help library based on the corresponding address.

2. The architecture of claim 1 wherein each help library has an update interface, the architecture further comprising an update engine for periodically requesting an update of topic metadata from each of the help libraries by way of the update interface thereof, for receiving the update by way of the update interface thereof, and for storing the update in the central store.

3. The architecture of claim 2 wherein the central store includes the update engine.

4. The architecture of claim 2 wherein the update as received by the update engine from the update interface of each help library is a complete set of topic metadata corresponding to all help topics available from the help library.

5. The architecture of claim 2 wherein the update as received by the update engine from the update interface of each help library is a delta set of topic metadata corresponding to all changes to help topics available from the help library since a previous update.

6. The architecture of claim 5 wherein the topic metadata is set forth in a hierarchical format, and the delta set of topic metadata is a hierarchical document set forth in a hierarchical differential language.

7. The architecture of claim 2 wherein the update engine stores the update from each help library serially.

8. The architecture of claim 2 wherein the update engine aggregates the updates from multiple help libraries and then stores the aggregated updates.

9. The architecture of claim 1 wherein the help topics include topics on a member of a group consisting of help, suggested samples, suggested next steps, suggested templates, suggested libraries, and combinations thereof.

10. The architecture of claim 1 wherein the application includes a plurality of components that operate to effectuate application functions, each component of the application being constructed to describe a current context of the component representative of a current state of the component, at least some of the components being active at any one time, the help engine operating to receive the current context from each active component, to dynamically build a current overall context of the application based on each received current context, to locate help topics based on the current overall context, and to filter and prioritize the located help topics.

11. The architecture of claim 1 wherein each help library includes a receive interface, and the help engine includes a complementary post interface for assisting the user in posting a help topic composed thereby to a help library by way of the receive interface thereof, the post interface of the help engine receiving the composed help topic and packaging same and related information in a predetermined format, and sending the packaged help topic 18 to the help library by way of the receive interface thereof, the help library upon receiving the packaged help topic un-packaging and storing as a posted help topic.

12. The architecture of claim 11 wherein the help library prior to storing the help topic submitting same for review by a reviewer.

13. The architecture of claim 11 wherein the post interface upon receiving the composed help topic also receives from the user keywords and/or attributes to be ascribed to the composed identified help topic.

14. The architecture of claim 11 wherein the post interface upon receiving the composed help topic also receives from a current context of the application keywords and/or attributes to be ascribed to the composed identified help topic.

15. The architecture of claim 11 wherein the post interface upon receiving the composed help topic also receives from the user additional information relating to the composed help topic including at least one of a title, a summary, and an author.

16. The architecture of claim 11 wherein the post interface upon receiving the composed help topic also receives from the user a selection of at least one help library to receive the composed help topic.

17. A method in combination with an application and a help engine operating on a computer, the method for locating and reviewing help topics relevant to the application, the method comprising:

the help engine sending a search request including search keywords to a central store and the central store receiving the search request;

the central store based on the search request reviewing topic metadata stored therein and locating pieces of topic metadata relevant to the search request, each located piece of topic metadata corresponding to a help topic available to the user from one of a plurality of help libraries by way of the computer, each piece of topic metadata in the central store including a set of keywords by which the help topic can be searched for and a set of attributes by which the help topic can be filtered;

the central store returning to the requesting help engine information from located pieces of topic metadata containing the search keywords, the returned information including for each piece of topic metadata a summary of the corresponding help topic, a set of attributes relating to the corresponding help topic and an address by which the corresponding help topic may be located in the corresponding help library;

the help engine filtering each located piece of topic metadata based on the set of attributes thereof and displaying information relating to each filtered piece of topic metadata to the user, the displayed information for each piece of topic metadata including the summary of the corresponding help topic and the address from which the corresponding help topic may be obtained from the corresponding help library;

the user reviewing the displayed summary corresponding to each help topic to determine whether the help topic is of further interest; and if so, the user employing the displayed address of the help topic of interest to obtain such help topic from the corresponding help library.

18. The method of claim 17 wherein the help topics include topics on a member of a group consisting of help, suggested samples, suggested next steps, suggested templates, suggested libraries, and combinations thereof.

* * * * *